Jan. 2, 1940.　　　C. REIMULLER　　　2,185,312
ELECTRICAL SNUBBING DEVICE
Filed Jan. 22, 1938　　　2 Sheets-Sheet 2
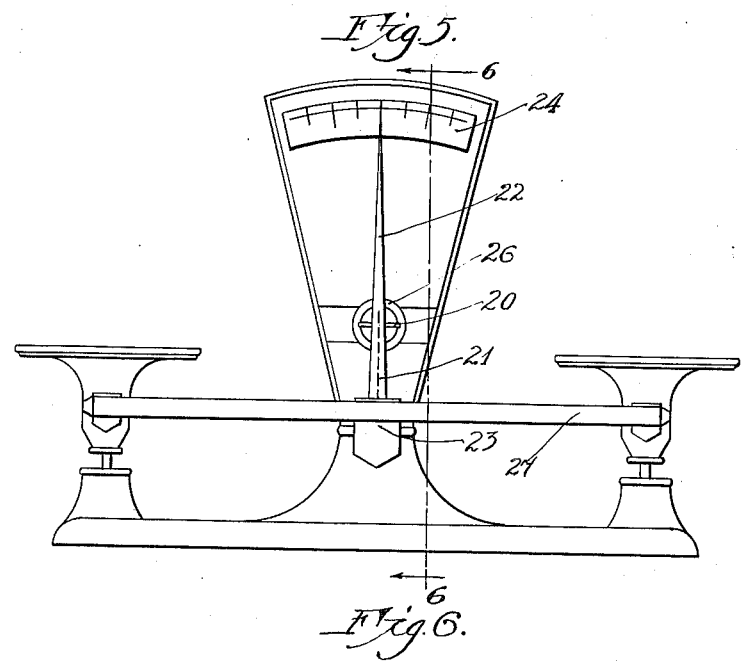
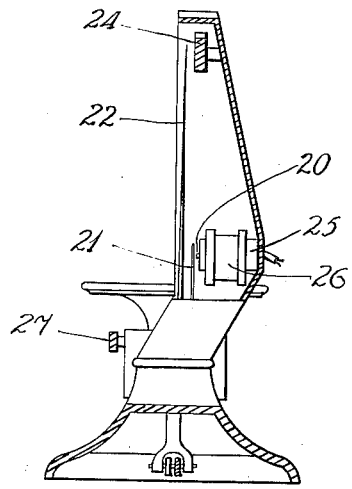

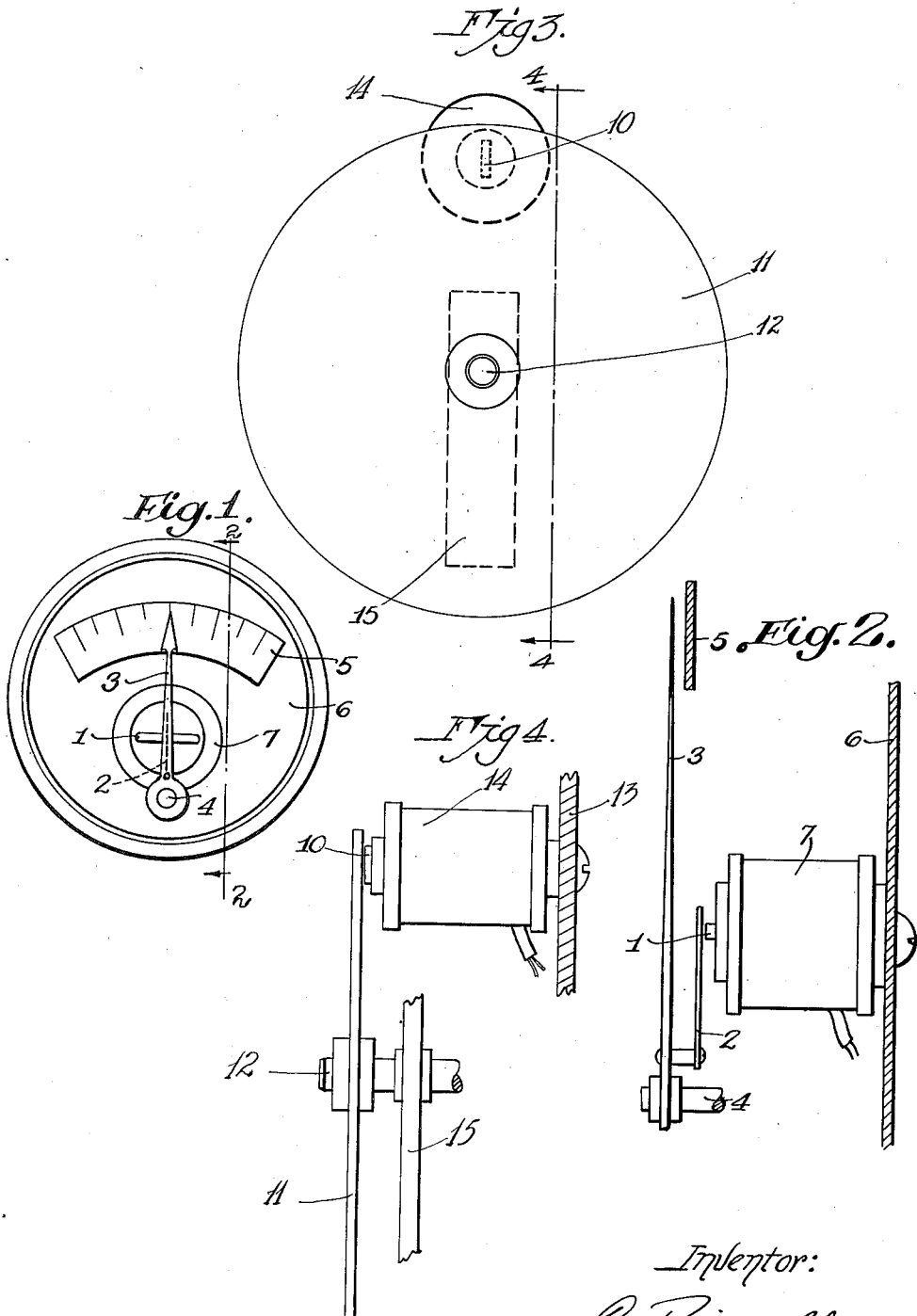

Patented Jan. 2, 1940

2,185,312

UNITED STATES PATENT OFFICE 2,185,312

ELECTRICAL SNUBBING DEVICE

Christian Reimuller, Chicago, Ill.

Application January 22, 1938, Serial No. 186,482

12 Claims. (Cl. 188—164)

This invention relates to improvements in a snubbing device, and more particularly to an electrically operated device for controlling motion of an element, such as any swinging or oscillating motion of any unsettled pointer or dial such as is commonly used on instruments, balances, meters or weighing scales of all descriptions.

One of the objects of the present invention is to provide a novel device of the character indicated for effectively dampening or retarding motion of a movable element.

Another object of the invention is to provide an efficient as well as a simple means to snub or check the oscillating or unsettled motion of dials and pointers.

A more specific object of my invention is to provide a mechanism of the character described wherein definite accuracy and reliability regarding the snubbing or checking of motion of dials or pointers can be relied upon to be constant under all atmospheric conditions of pressure and temperature.

A further object is to provide an improved device of the character indicated which is capable of snubbing or checking motion of an oscillating element, such as a dial or pointer, in such a stabilizing manner as not to interfere with the sensitivity of nor affect the true zero or equilibrium position that said dial or pointer tends to attain.

A still further object of my invention is to provide a simple, compact and inexpensive means of the character described for accomplishing the aforementioned objects.

With the above mentioned and other objects in view, this invention consists in the novel application and combination of parts hereinafter described and illustrated in the accompanying drawings, and set forth in the claims hereto appended, it being understood that various modifications and changes in the form, proportion, size and minor details of construction within the scope of the claims may be resorted to without departing from the spirit or sacrificing any of the advantages of the invention.

To more fully comprehend the invention, reference is directed to the accompanying drawings wherein:

Fig. 1 is a face view of a meter with certain front parts removed to more clearly show the interior construction.

Fig. 2 is an enlarged fragmentary cross-section view on line 2—2 of the meter shown in Fig. 1.

Fig. 3 is a view of a rotating disc mechanism with certain parts removed to more clearly show the construction.

Fig. 4 is a fragmentary cross section view on line 4—4 of the mechanism shown in Fig. 3.

Fig. 5 is a front view of a weighing scale with certain parts removed to more clearly show the interior construction.

Fig. 6 is a partial cross section view on line 6—6 of the weighing scale shown in Fig. 5.

I am aware of several attempts heretofore made to magnetically retard oscillation of an element, but such proposed constructions have not to my knowledge proved successful due to various reasons. Most of such proposed constructions were considered objectionable due to the fact that they required manual adjustment or manual control for actuation thereof. I am also aware of the fact that dash-pots have been widely used for the purpose of retarding or dampening motion, such as the indicator of a scale. It is generally recognized, however, that dash-pots are not considered satisfactory, primarily because of the necessity of frequent adjustments to compensate for variations in temperature and pressure.

The use of an electro-magnet and a snubbing member attached to the beam or pointer of a scale or meter are the general complementary parts that constitute one form of this invention. Said snubbing member is formed of magnetic material and is resiliently mounted and held in close proximity to the face of the core of the electro-magnet, which when charged with an alternating current, of one of the medium frequencies, alternately attracts and releases the snubbing member, which functions electro-mechanically to intermittently hold the rotating or oscillating beam or arm or member to dampen and retard its rotating or oscillating motion. Therefore, shortening or governing the amplitude or period of said beam or arm or member, or retardation of a rotating member is accomplished in a rapid, accurate, and expeditious manner without impairing the accuracy of the final or arrested position of the beam or pointer or other element being snubbed.

Referring more particularly to the several views of the drawings in detail, wherein like characters of reference indicate corresponding parts, Figures 1, and 2, constitute different views of a meter. Numeral 1 designates the extended core of the electro-magnet 7, which is mounted on a bracket 6. Numeral 2 designates the magnetic snubbing means which is resiliently attached to the pointer hand 3 which is in turn mounted on a rotatable shaft 4. Dial readings are obtained on dial 5 by the super-imposition of pointer hand 3 over dial 5. The magnetic snubbing member 2 is shown in close proximity to the extended core 1, of the electro-magnet, to which it is intermittently attracted by the alternating impulses of the current during oscillation of the pointer hand 3, to produce a snubbing or braking effect and thereby retarding said pointer hand 3. Such snubbing action rapidly brings the pointer hand 3 to rest by step-by-step diminution of its amplitude of oscillation.

In Figures 3, and 4, which constitute different views of a rotating disc mechanism, numeral 10 shows the extended core of an electro-magnet 14, which is substantially held on its mounting 13. The disc 11 constitutes the said magnetic snubbing means and is mounted to rotate with shaft 12 which is held in the bracket extension 15. It is to be understood that the disc 11 and/or the shaft 12 is mounted so as to provide a certain amount of axial movement so that the disc, during alternate impulses of current, is free to rotate. The disc 11, which is the magnetic member is disposed in close proximity to the extended core 10, to which it is intermittently attracted by the alternating impulses of the current, for causing a snubbing action on the rotating magnetic disc member 11, to retard its rotation. This produces a constant step-by-step braking action on the rotating disc member, by virtue of which said disc is permitted to rotate at a constant or uniform rate of speed.

By way of illustration, let it be assumed that a force is applied to shaft 12 to cause rotation thereto, and assume further that an alternating current is coursing through the electro-magnet 14 causing a magnetic field to be developed at either end of the coil. Said developed magnetic field furnishes the necessary attraction to overcome the torque supplied to the disc 11 which is drawn toward the extended core 10 because shaft 12 or disc 11 is capable of slight axial movement. The disc is intermittently held against rotation by said energized electro-magnet during that moment, and because the current used is of an alternating nature, the holding of the disc 11 by electro-magnet 14 will last for only a fractional part of a second, for then the alternating current will have reversed its direction of flow which reverses the polarity of the electro-magnet 14, and also the polarity of the magnetic member 11, releasing said member which with the axial motion in shaft 12 or disc 11, will then rotate because of the aforementioned force being applied to the shaft 12. But, the rotation of said magnetic member is again immediately checked by the next attraction of said electro-magnet 14, so that the disc 11 is caused to rotate in small increments in a step-by-step manner.

In Figures 5 and 6, which show different views of a weighing scale, numeral 20 designates the extended core of the electro-magnet 26, which is mounted on bracket 25. Numeral 21 designates the magnetic snubbing means which is resiliently or hingedly attached to the dial hand or pointer 22, which is in turn rotatable on axis 23, mounted on beam 27. Dial readings are obtained on dial 24 by the super-imposition of dial pointer hand 22 over dial 24. The magnetic member 21 is also shown in close proximity to the extended core 20 as is the general case. When the electro-magnet 26 is magnetized with an alternating current it alternately attracts and releases the snubbing means 21 which tends to snub or retard the unsettled swinging or rotation of beam 27, together with the superimposed dial hand 22, by alternately holding and releasing the magnetic member 21 during its passage across the face of the extended core 20 of electro-magnet 26.

The general purpose of the several views is to show divers ways of using this snubbing mechanism. Other ways of utilizing this principle exist, but it is not deemed essential to illustrate same. The general unique utilization of an alternating current in combination with an electro-magnet and magnetic member are the necessary complementary parts used to create the novel result herein disclosed. It is, of course, understood that an electrical current of medium frequency should be used, as a high frequency alternating current would produce a substantially constant holding of the magnetic member rather than a snubbing effect. It has been found that alternating current of 60 cycles or less produces highly satisfactory results and it is believed likely that a current of a somewhat greater frequency may also be employed with reasonably good results.

It is to be understood that my electrical snubbing device is not limited only to the employment illustrated in the various drawings, since many other applications are possible, and I contemplate such changes and modifications that come within the scope of the claims appended hereto. For example, a construction may be employed wherein both the snubbing magnetic element and electro-magnet are moving simultaneously and it is desired to retard or snub the movement of one with respect to the other.

It is to be understood that the magnetic snubbing members 2 and 21 in the respective constructions disclosed in Figs. 1 and 2 and 5 and 6 respectively may be formed of resilient or yieldable material, and are mounted so as to be normally yieldingly urged a short distance away from the end of the cores of their respective electro-magnets. In some uses, it may be desirable to hingedly mount the snubbing members at one end to provide for movement toward or away from the cores of said magnets. Desirably, though not essentially, the magnetic members are formed of soft iron because such material possesses the characteristic of low magnetic retentivity. By virtue of the construction described, the oscillating motion of an element, such as a pointer or dial, is caused to be snubbed or checked in a manner so as not to interfere with the sensitivity of nor effect the true zero or equilibrium position that the pointer or dial seeks to attain. Furthermore, such apparatus has the additional advantage of serving to absorb unstable mechanical fluctuations in such structures and tends to rapidly bring the system into a condition of balance or equilibrium.

Having thus described my invention, what I claim is:

1. In an electrical snubbing device of the character indicated, the combination of electro-magnetic means having a core and adapted to be periodically energized by alternating current, and means including a magnetic element normally disposed in close proximity and adapted to be periodically attracted to the core of said electro-magnetic means, one of said means being movable relatively to the other, whereby periodical energization of said electro-magnetic means causes periodic engagement of said magnetic element with the core of said electro-magnetic means for controlling the motion of said movable means.

2. In an electrical snubbing device of the character indicated, the combination of electro-magnetic means having a core and adapted to be energized by alternating current, and means including a magnetic element normally disposed in close proximity and adapted to be periodically attracted to the core of said electro-magnetic means, one of said means being movable relatively to the other, whereby energization of said electro-magnetic means causes periodic engagement of said magnetic element with the core of said electro-magnetic means for retarding the motion of said movable means.

3. In an electrical snubbing device of the character indicated, the combination of electro-magnetic means having a core and adapted to be energized by alternating current, and means including a flexible element normally disposed in close proximity and adapted to be periodically attracted to the core of said electro-magnetic means, one of said means being movable relatively to the other, whereby energization of said electro-magnetic means causes periodic engagement of said magnetic element with the core of said electro-magnetic means for controlling the motion of said movable means.

4. In an electrical snubbing device of the character indicated, the combination of electro-magnetic means having a core and adapted to be energized by alternating current, and means mounted for bodily movement in planes substantially parallel to the face of the core of said electro-magnetic means, said movable means including a movable magnetic element normally disposed in close proximity and adapted to be periodically attracted to the core of said electro-magnetic means, for controlling the motion of said bodily movable means.

5. In an electrical snubbing device of the character indicated, the combination of electro-magnetic means having a core and adapted to be energized by alternating current, and means mounted for bodily movement in planes substantially parallel to the face of the core of said electro-magnetic means, said movable means including a movable magnetic element normally disposed in close proximity and adapted to be periodically attracted to the core of said electro-magnetic means, for retarding the motion of said bodily movable means.

6. In an electrical snubbing device of the character indicated, the combination of electro-magnetic means having a core and adapted to be energized by alternating current, and means mounted for bodily movement in planes substantially parallel to the face of the core of said electro-magnetic means, said movable means including a flexible magnetic element normally disposed in close proximity and adapted to be periodically attracted to the core of said electro-magnetic means, for controlling the motion of said bodily movable means.

7. In an electrical snubbing device of the character indicated, the combination of electro-magnetic means having a core and adapted to be energized by alternating current, and means mounted for movement in a predetermined path relatively to said electro-magnetic means, said movable means including a movable magnetic element normally disposed in close proximity and adapted to be periodically attracted to the core of the electro-magnetic means, for controlling the motion of said movable means.

8. In an electrical snubbing device of the character indicated, the combination of electro-magnetic means having a core and adapted to be energized by alternating current, and means mounted for oscillatory movement in a predetermined path adjacent said electro-magnetic means, said oscillatory means including a movable magnetic element normally disposed in close proximity to the core of said electro-magnetic means substantially throughout the range of oscillatory movement, said magnetic element being adapted, upon energization of the electro-magnetic means, to be periodically attracted to the core of said electro-magnetic means for gradually retarding oscillation of said oscillatory means.

9. In an electrical snubbing device of the character indicated, the combination of electro-magnetic means having a core and adapted to be energized by alternating current, and means mounted for oscillatory movement in a predetermined path adjacent said electro-magnetic means, said oscillatory means including a magnetic element of flexible material normally disposed in close proximity to the core of said electro-magnetic means substantially throughout the range of oscillatory movement, said magnetic element being adapted, upon energization of the electro-magnetic means, to be periodically attracted to the core of said electro-magnetic means for gradually retarding oscillation of said oscillatory means.

10. In an electrical snubbing device of the character indicated, in combination with a measuring device having a calibrated element and an indicator element, one of said elements being movable relatively to the other; electro-magnetic means having a core and adapted to be energized by alternating current, and a movable magnetic element, carried on the movable element of the measuring device, and positioned in close proximity to the core of the electro-magnetic means, whereby energization of the electro-magnetic means causes periodic attraction of said magnetic element to the core of said electro-magnetic means for dampening the movement of said movable element of the measuring device.

11. In an electrical snubbing device of the character indicated, in combination with a measuring device having a calibrated element and an indicator element, one of said elements being movable relatively to the other; electro-magnetic means having a core and adapted to be energized by alternating current, and a flexible magnetic element, carried on the movable element of the measuring device, and positioned in close proximity to the core of the electro-magnetic means, whereby energization of the electro-magnetic means causes periodic attraction of said magnetic element to the core of said electro-magnetic means for dampening the movement of said movable element of the measuring device.

12. The combination of an electro-magnet having a core and adapted to be energized by alternating current, and a rotatable disc disposed in registration with and in close proximity to the core of said electro-magnet, the annular band of said disc which traverses the core upon rotation of the disc being of magnetic material, whereby energization of said electro-magnet periodically attracts said disc to said core for maintaining a uniform speed of rotation of said disc.

C. REIMULLER.